United States Patent [19]

Cook

[11] Patent Number: 4,519,280
[45] Date of Patent: May 28, 1985

[54] MITER BOARD AND SAW GUIDE

[76] Inventor: Carl E. Cook, 2120 Canyon Dr., Amarillo, Tex. 79109

[21] Appl. No.: 518,649

[22] Filed: Jul. 29, 1983

[51] Int. Cl.³ .............................................. B27B 9/04
[52] U.S. Cl. .......................................... 83/34; 83/36; 83/463; 83/477.1; 83/486.1; 83/574; 83/743; 269/91; 269/100
[58] Field of Search ...................... 83/486.1, 574, 745, 83/743, 485, 581, 36, 34, 477, 477.1, 463; 269/91, 93, 100, 900, 249, 291, 295

[56] References Cited

U.S. PATENT DOCUMENTS

| | | | |
|---|---|---|---|
| 102,487 | 5/1870 | Canfield | 269/93 |
| 979,039 | 12/1910 | Shawver | 269/91 |
| 1,463,564 | 7/1923 | Taylor | 269/93 X |
| 2,595,322 | 5/1952 | Avery | 83/574 |
| 2,770,265 | 11/1956 | Pollock | 83/486.1 X |
| 2,803,271 | 8/1957 | Shaw | 83/574 X |
| 2,804,104 | 8/1957 | Sasso | 83/486.1 X |
| 3,901,498 | 8/1975 | Novak | 83/581 X |
| 4,292,870 | 10/1981 | Mericle | 83/574 X |
| 4,320,678 | 3/1982 | Volk | 83/581 X |

FOREIGN PATENT DOCUMENTS 2037655   7/1980   United Kingdom ................. 83/574

*Primary Examiner*—Frank T. Yost
*Attorney, Agent, or Firm*—Wendell Coffee; Montgomery W. Smith

[57] ABSTRACT

A device for making miter cuts in workpieces includes a saw guide pivoted to either a bottom surface B or a top surface A of a board. The saw guide includes two plates spaced above the board surfaces by a pivot assembly and a swing assembly. Almost any commercially available circular power saw may be accommodated by placing the saw base on the plates, positioning the saw blade within alignment slots in the assemblies, and adjusting rails on the plates against the saw base. A keeper on one of the rails prevents the saw from jumping out of the saw guide. When the rails are properly adjusted, the circular saw blade will travel along a saw line between the plates from alignment slot to alignment slot. The top surface A of the board has a straight edged backup adjacent a planar work area. 90° and 45° stops on the top surface reliably and accurately position the saw line normal to or at a 45° angle to the straight edge and aligned with 90° and 45° slots in the backup. Angled miter cuts are also made on the top surface by positioning the saw guide in the 90° stops, and aligning the side of the workpiece held by C-clamps through holes in the board between the 90° slot in the backup and a selected angle mark so that the workpiece side forms a desired angle with the saw line. The bottom surface of the board has a reference line and bottom angle marks. A workpiece side is aligned with the reference line, and an edge of the swing assembly is aligned with the selected bottom angle mark so that the saw line is at a desired angle to the reference line and workpiece.

11 Claims, 12 Drawing Figures

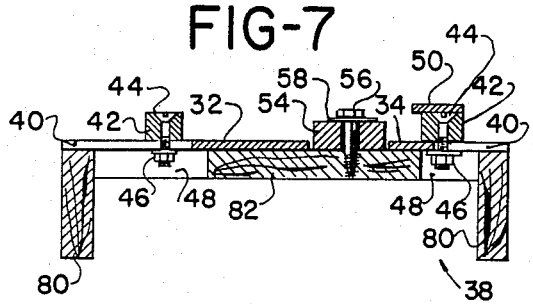
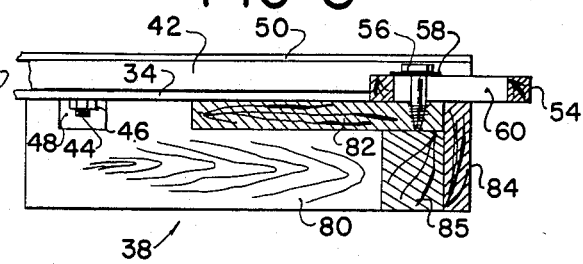
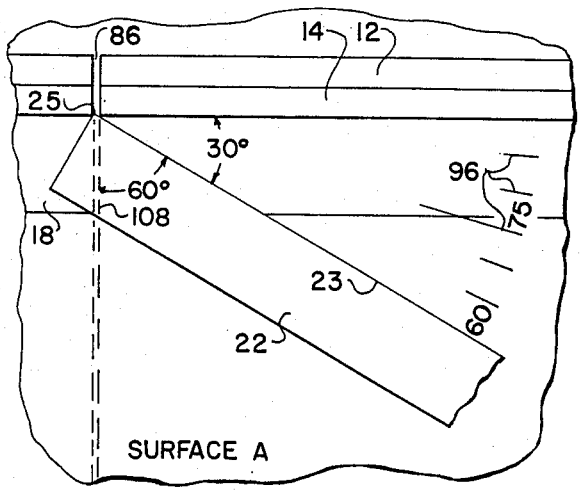
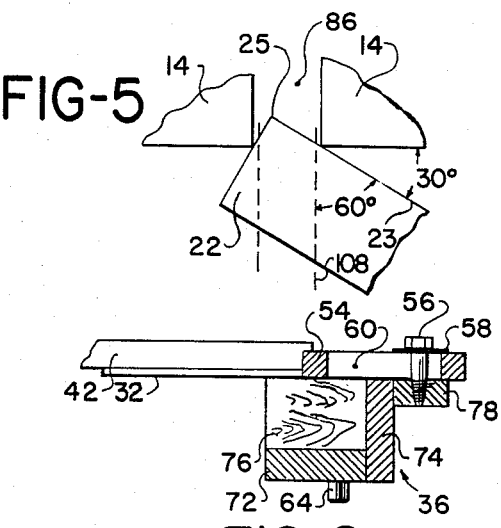
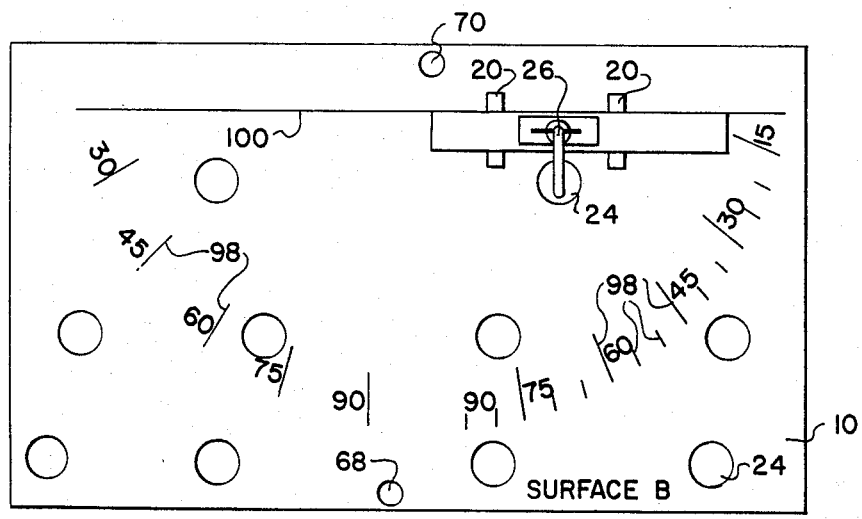

MITER BOARD AND SAW GUIDE

CROSS REFERENCE TO RELATED APPLICATIONS

None. However, applicant filed Disclosure Document No. 116,597 on Apr. 18, 1983, which document concerns this application; therefore, it is respectfully requested that the document be retained and acknowledgement thereof made by the Examiner (MoPEP 1706).

BACKGROUND OF THE INVENTION

1. Field of the Invention

This invention relates to devices for accurately sawing workpieces with manual power saws.

2. Description of the Prior Art

When making cabinets, furniture, frames, and other objects with joined edges, it is frequently necessary to make accurate miter cuts. A manual circular power saw is frequently employed by workmen in making such cuts. However, it is difficult to obtain satisfactory, accurate cuts when guiding the power saw along a mark on the workpiece by hand.

Prior to my invention, devices were available for use with power saws that permitted the accurate cutting of workpieces. Unfortunately, many of these prior art devices were either too expensive, too big, too complicated, or too limited in application to substantially benefit most hobbyists or workers that had infrequent need of them.

Before filing this application, a search was conducted in the U.S. Patent and Trademark Office. That search disclosed the following U.S. patents:

| | |
|---|---|
| AVERY | 2,595,322 |
| SHAW | 2,803,271 |
| SASSO | 2,804,104 |
| DRUMBORE | 3,368,594 |
| MARSHALL | 4,208,937 |
| GORMAN | 4,281,694 |
| VOLK | 4,350,066 |

These patents are considered pertinent because the applicant believes the Examiner would consider anything revealed by the search to be relevant and pertinent to the examination of this application.

SUMMARY OF THE INVENTION

(1) New Function and Surprising Results

I have solved many of the problems described above by inventing a device for making accurate miter cuts that may be inexpensively manufactured, simply used and stored, and that is so versatile that it performs all functions customarily performed by a table saw, except ripping. My invention incorporates a saw guide that is pivotable to either side or surface of a flat board. The saw guide is adaptable to practically any commercially available hand held circular power saw. It may be inexpensively constructed, and is easily used by the operator because of numerous preset angles and alignment positions built into the miter board. The workpiece may be clamped to the board through convenient holes therein. My invention obtains the unusual and surprising results of providing a device that makes accurate miter cuts with a variety of power saws on a simple, inexpensive saw guide and board with my novel combination of boards, steel plates, pins, bolts, nuts, screws, wood, etc.

The saw guide of my invention incorporates a special alignment system wherein the saw blade of practically any commercially available hand held circular power saw may be aligned to slide along a saw line. With the saw blade stopped, the blade is positioned in an alignment slot at each end of the saw guide. Rails are adjusted against the saw base sides to guide the saw along the proper saw line between the alignment slots. When the saw is running, the alignment slots are blocked off to prevent damage or enlargement of the slot width.

The miter board of my invention may be used to make miter cuts of almost any required angle by either angling a workpiece at a desired angle to a preset saw line or by angling the saw blade to the workpiece aligned with a preset reference line or backup. Additionally, bevel cuts may be made at various angles by tilting the saw on its base, and aligning the saw guide and workpiece as described.

Thus it may be seen that the function of the total combination greatly exceeds the sum of the functions of the individual elements, such as boards, shims, stops, holes, plates, rails, etc.

(2) Objects of this Invention

An object of this invention is to make desired cuts in work pieces.

Further objects are to achieve the above with a device that is sturdy, compact, durable, lightweight, simple, safe, accurate, efficient, versatile, ecologically compatible, energy conserving, and reliable, yet inexpensive and easy to manufacture, assemble, adjust, operate and maintain.

Other objects are to achieve the above with a method that is versatile, accurate, ecologically compatible, energy conserving, rapid, efficient, and inexpensive, and does not require skilled people to assemble, adjust, operate, and maintain.

The specific nature of the invention, as well as other objects, uses, and advantages thereof, will clearly appear from the following description and from the accompanying drawings, the different views of which are not scale drawings.

BRIEF DESCRIPTION OF THE DRAWING

FIG. 4 is a plan view of the top surface showing the alignment of a workpiece for a 60° miter cut.

FIG. 5 is a detailed plan view of the alignment of the workpiece and slot shown in FIG. 4.

FIG. 6 is a plan view of the bottom surface of the miter board without the saw guide.

FIG. 7 is an end section view of the swing assembly of the saw guide taken substantially along line 7—7 of FIG. 2.

FIG. 8 is a side sectional view of the swing assembly taken substantially along line 8—8 of FIG. 2.

FIG. 9 is a side section view of the pivot assembly taken substantially along line 9—9 of FIG. 2.

DESCRIPTION OF THE PREFERRED EMBODIMENT

Figure 1:
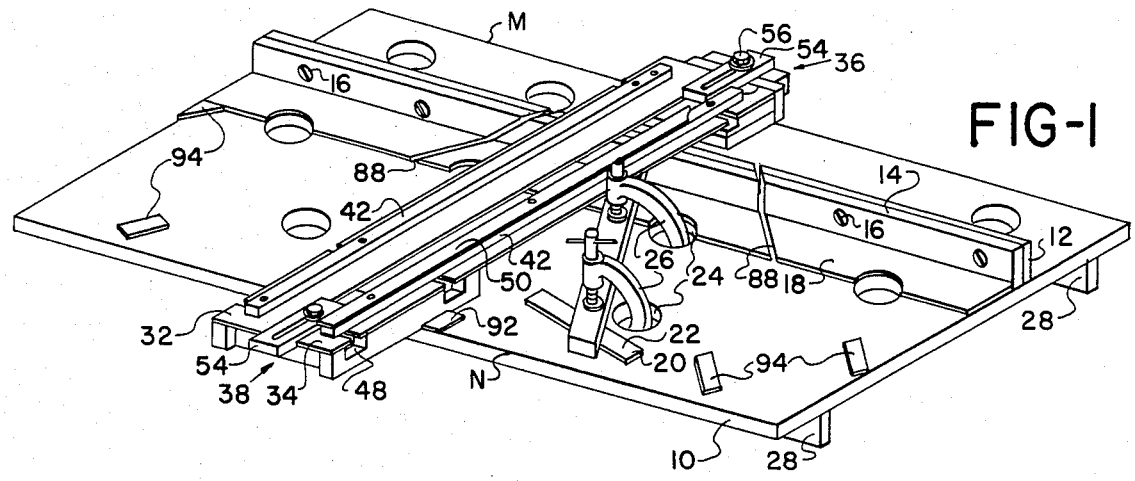
FIG. 1 is a perspective view of a miter board according to my invention with a workpiece clamped in position.

Generally speaking, my invention includes a saw guide for holding a circular power saw, pivoted to a base. The base is in the form of flat board 10 with permanent backup 12 mounted on a planar top surface A of the board. A planar bottom surface B of the board 10 is opposite the top surface A. Replaceable backup 14 is positioned adjacent the permanent backup 12, is secured to the permanent backup 12 with backup screws 16, and is replaced when damaged or worn through use.

The board 10 is rectangular in shape with two parallel sides that are shorter than a parallel edge M and edge N. The permanent backup 12 and the replaceable backup 14 form a backup that is parallel to the edges M and N and extending from side to side on the top surface A of the board 10. The backup is also closer the edge M top than edge N, and has a straight edge along the outer edge of the replaceable backup 14. A planar top work area is adjacent to and extends from the straight edge of the backup.

Permanent shim 18 is attached to the top surface of the board 10 adjacent the backup 14. The permanent shim 18 is preferably about ⅛ inch thick. The permanent shim 18 is used in combination with temporary shim 20 of the same thickness to raise workpiece 22 above the board 10 top surfaces A and B. Most circular power saws available commercially have depth of cut adjustment capabilities. Therefore, when the saw is mounted in the saw guide, the depth of cut is adjusted such that the saw blade may cut slightly into the shims 18 and 20, but not into the board 10. The use of the shims 18 and 20 permits cutting completely through the workpiece 22 without marring the board 10 surfaces. The use of two temporary shims 20 is also preferred when using the bottom surface B of the board 10, as shown in FIG. 6.

The board 10 has clamp holes 24 spaced thereover. The clamp holes 24 permit the insertion of clamps, preferably in the form of C-clamps 26 therethrough to clamp the workpiece 22 to the board 10. The use of clamps with the miter board enhances safety, since fingers that might get caught in the saw blade are removed from holding the workpiece. More precise cuts are obtained, because the clamped workpiece 22 is fixed and more stable than a hand held one. Of course, the clamp holes 24 may be arranged, spaced or shaped as desired to enable convenient clamping, the pattern of arrangement and shape shown in the figures being exemplary.

I prefer to provide legs 28 fastened to the board 10 with leg bolts 30. The legs 28 may be mounted on either the top A or the bottom B surfaces of the board 10. The legs extend from the board 10 a distance greater than do the backups 12 and 14. The legs prevent marring or damage to the surfaces of the board 10 and the backups 12 and 14, stiffen or reinforce the board 10, and provide level support on a table or other surface. The positions of the legs on the surfaces A and B are preferably staggered to avoid weakening the board where the legs fasten to it.

The saw guide of the miter board includes a pair of tracks separated by a track gap. The tracks are in the form of left track plate 32 and right track plate 34. The surfaces of the plates 32 and 34 are in a track plane. The track plates and the track plane are maintained substantially horizontal and spaced above the board 10 by pivot assembly 36 attached to ends, and swing assembly 38 attached to opposite ends, of the plates 32 and 34. The bottoms of the pivot and swing assemblies are flat, and adapted to slide over the surfaces of the board 10.

The plates are spaced above the board 10 a distance sufficient to conveniently position the workpiece 22 thereunder, and in any event a greater distance above the board 10 than the backups 12 and 14 extend. It will be understood that although steel plates are preferred for the tracks, the tracks may be made of wood or other suitably rigid substance extending between the pivot and swing assemblies 36 and 38. Of course, shims could be placed under or attached to the assembly bottoms to elevate the track plates for cutting very thick workpieces.

The plates 32 and 34 have adjustment slots 40 preferably along the outer edges thereof, that is, along the edges of the plates 32 and 34 opposite the track gap. Rails 42 are adjustably fastened, secured or connected to the plates 32 and 34 by bolts 44 and nuts 46, threaded thereon. The bolts 44 extend through holes in the rails 42 and through the adjustment slots 40. The nuts and bolts are tightened to rigidly secure the rails to the plates. The rails 42 are parallel, and positioned on the plates 32 and 34 adjacent to and in position to guide the base of a power saw placed on the plates 32 and 34 between the rails 42, so that the saw blade of the saw will move along a preset saw line 108. The specific alignment procedure for adjusting the saw guide for a particular saw will be described in greater detail later.

Notches 48 in the assemblies 36 and 38 provide convenient access for tightening or loosening the nuts and bolts. Of course, other means of adjusting the position of the rails on the plates could be devised, the slots and bolts being the preferred embodiment. Additionally, the adjustment feature may be eliminated, and the rails attached parallel to the plates for use with a predetermined saw model or brand.

For safety, the rail 42 attached to the right plate 34 preferably has keeper 50 mounted thereon. The keeper 50 is preferably a thin metal stop or plate screwed to the rail 42 with screws 52. The keeper 50 extends just past the edge of the rail 42 toward the track gap (FIG. 7). The keeper 50 prevents the saw from jumping from between the rails 42 during operation. Although not shown, sometimes a shim is necessary under keeper 50 for proper spacing so that the saw base slides freely on the track plates.

The saw guide also has blocks or block members 54 mounted thereon at the ends of the track gap and preferably between the plates 32 and 34. The blocks are adjustably mounted to the assemblies 34 and 36 by block bolts 56 and block washers 58. The block bolts 56 extend through block slots 60 in the blocks 54.

Figure 2:
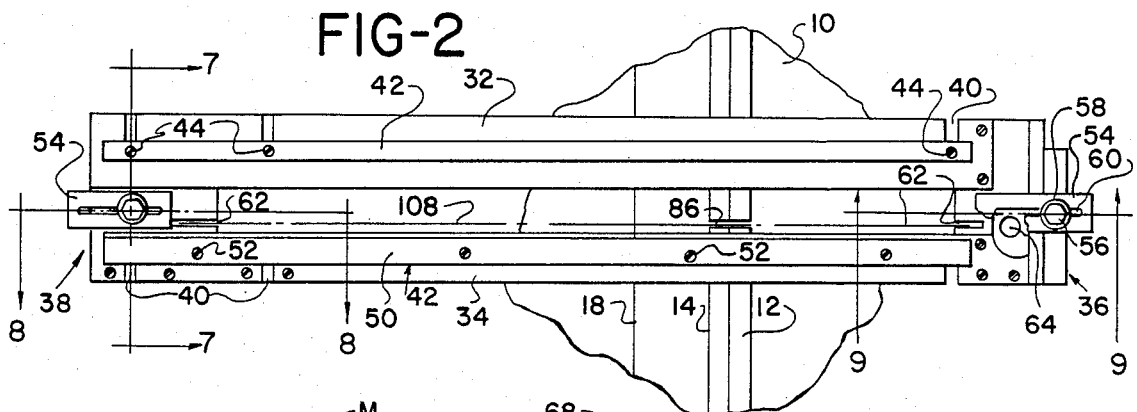
FIG. 2 is a top plan view of the saw guide shown in FIG. 1.

Alignment slots 62 are cut into the pivot and swing assemblies 36 and 38, and extend from the track gap into the assemblies. The slots are substantially contained in an alignment plane that is vertical to the surface of the board 10. The intersection of the alignment plane and the track plane defines the saw line 108. The adjustment slots 62 are used to position the rails 42 on the plates 32 and 34 for each particular saw being employed with the miter board. The slots 62 are substantially the same width as the saw blade of the power saw. The alignment slots are close to the right plate 34 so that the saw line extends adjacent and parallel the plate 34, preferably spaced about 1/32 inch therefrom. The saw line corresponds to the right hand mounting of the blades of most commercially available saws. If a saw with a left mounting is employed, suitable adaptations in the saw guide may be made. This close spacing to the right plate 34 insures that the saw blade guard of the saw will rest on and slide along the plate 34 during operation of the saw. If the alignment slots are not positioned close to the plate 34, the saw guard will fall down below the plates and interfere with the operation of the saw and saw guide. It will be understood that in FIG. 2, the backups 12 and 14 are spaced away from the pivot assembly a greater distance than preferred for purposes of clarity in describing the alignment functions of my invention.

Figure 10:
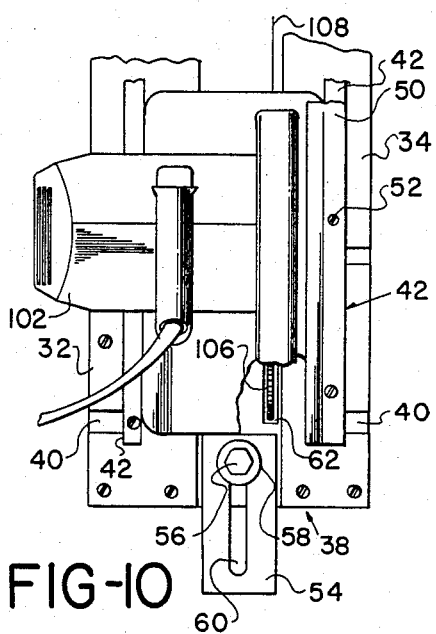
FIG. 10 is a top plan view of the saw guide with a power saw mounted thereon with parts broken away to show the saw blade aligned within the alignment slot.
Figure 11:
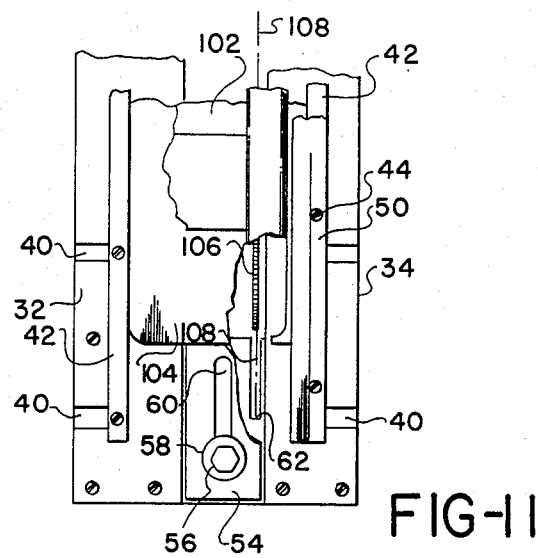
FIG. 11 is a top plan view of the saw guide shown in FIG. 10 with the block positioned to prevent entry of the saw blade into the alignment slot.

Referring to FIGS. 10 and 11, to adjust the saw guide to a particular power saw 102, base 104 of the saw 102 is placed on the plates with saw blade 106 in the track gap proximate the right plate 34. The blocks are moved away from the track gap to permit the stationary saw blade to be inserted in one of the alignment slots by sliding the saw toward the assembly 36 or 38, as shown in FIG. 10. With the saw blade positioned within an alignment slot 62, the bolts and nuts 44 and 46 are loosened and the rails 42 are moved flush with the sides of the saw base. The bolts and nuts 44 and 46 are then tightened to hold the rails in position. The saw is moved to the other slot 62. With the saw blade in the other alignment slot 62, the rails 42 are adjusted as before.

After the rails have been adjusted such that the saw blade may freely slide from slot to slot, the bolts and nuts 44 and 46 are tightened to securely fasten the rails 42 in the proper position. The blocks 54 are then moved to a position where they will abut the saw base before the blade enters the alignment slots 62, as shown in FIG. 11. The blocks 54 prevent damage or undesirable widening of, the slots 62 by preventing entrance of the saw blade when it is spinning.

The saw guide is pivoted to or interconnected with the surfaces of the board 10 by pivot means in the form of pivot pin 64 inserted through pivot hole 66 in the pivot assembly 36, and holes in the board 10. The pivot hole 66 is aligned with the alignment slots 62, such that the saw line between the alignment slots also would extend substantially through the center of the pivot hole 66. The pivot pin 64 has smooth sides and snugly fits within the pivot hole 66.

Pivot point 68 is employed in connection with the top surface of the board 10, and is spaced away from the backup 12 a sufficient distance to allow clearance between the pivot assembly 36 and the backup 12. Pivot point 70 is for use in connection with the bottom surface of the board 10. The pivot pin extending past the bottom of the pivot assembly fits snugly within holes in the board at the pivot points 68 and 70 to pivot or interconnect the board and the saw guide on the top or bottom surfaces for movement about a pivot axis normal to the surfaces that coincides with the pivot points. Although a single pivot point could in some cases be sufficient, I prefer to provide the two pivot points 68 and 70 for the conveninece of the operator. Of course, other structures for pivoting the saw guide to the board 10 may be devised and still be within the scope of my invention.

Figure 12:
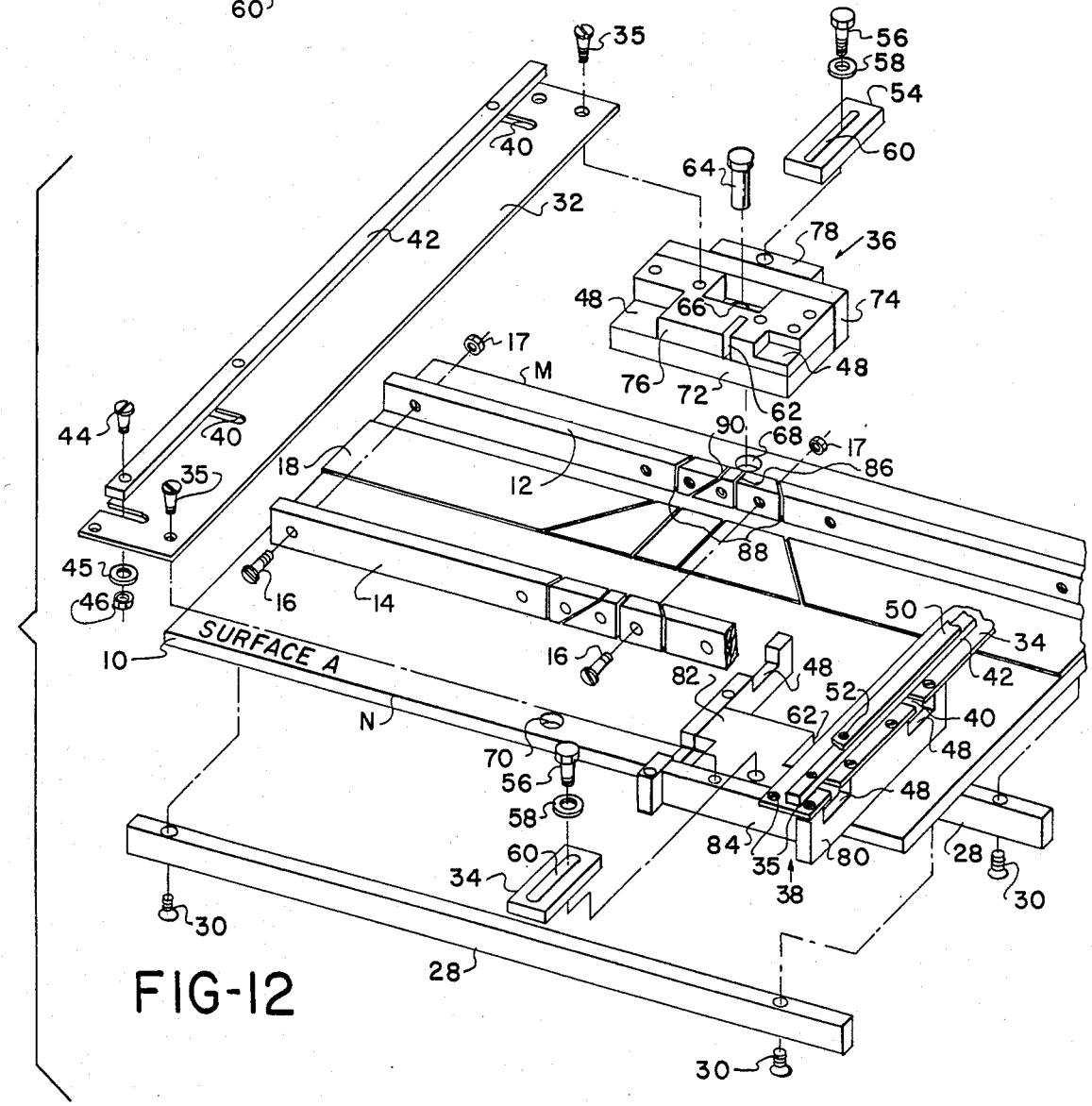
FIG. 12 is a partially exploded perspective view of the miter board shown in FIG. 1.

The pivot assembly 36 is preferably assembled from wood pieces shown in FIGS. 9 and 12 in detail. Base 72 and end 74 support slot piece 76 and block piece 78. The slot piece 76 has the alignment slots 62 of the pivot assembly 36 therein, as well as the notches 48. The pivot hole 66 extends through the base 72. The slot piece 76 is cut out to receive the head of the pivot pin 64. Of course, the pivot assembly 36 could be cut or machined from a single piece of material instead of being assembled with the base 72, end 74, slot piece 76 and block piece 78. It will also be understood that the pivot assembly 36 may be differently shaped, so long as the pivot assembly 36 functions to space the plates 32 and 34 above the board 10, to position the pivot pin 64 and the alignment slot 62, and to permit access to the bolts 44 and nuts 46.

The swing assembly 38 is also preferably formed from wood pieces, as shown in FIGS. 7, 8 and 12. Runners 80, are spaced apart by horizontal spacer 82. The runners 80 and back 84, reinforced by reinforcement block 85, provide convenient mounting structure for the plates 32 and 34. The spacer 82 contains the alignment slot 62 of the swing assembly 38 and serves as the mounting point for the block 54 of the swing assembly 38. The notches 48 are also cut into the runners 80 and spacer 82. Of course, as with the pivot assembly 36, the swing assembly 38 may be cut or machined from a single piece of material. It may be of a different form, so long as the form accommodates the mounting of the plates 32 and 34, adjustment of the bolts 44 and the nuts 46, and the alignment slot 62, and the block 54. It should also be apparent that the height of the pivot assembly 36 and the swing assembly 38 should be the same to space the track plane and the plate 32 and 34 above and parallel to the board 10 surfaces and work areas.

Figure 3:
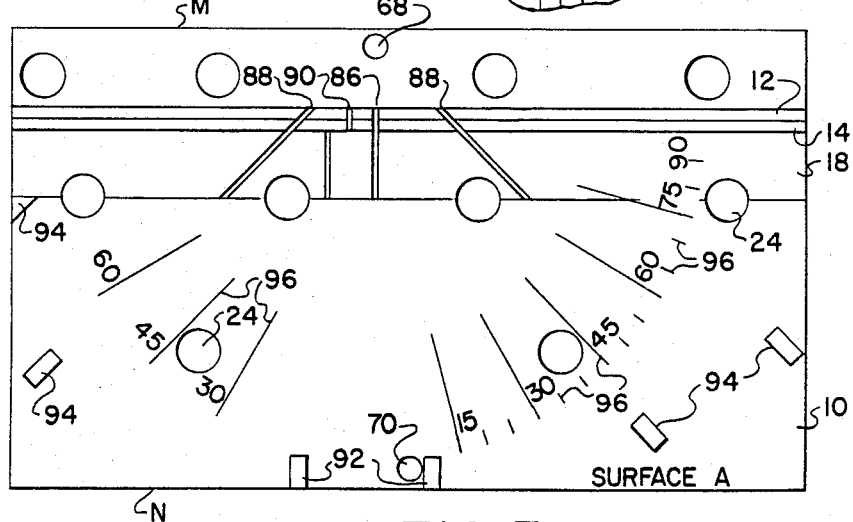
FIG. 3 is a plan view of the top surface of the miter board without the saw guide.

Referring to FIGS. 1 and 3, 90° slot 86 and 45° slots 88 extend through the backups 12 and 14 and superficially into the permanent shim 18. Bevel slot 90 also extends through the backups 12 and 14. While I prefer to cut the slots 86 and 88 prior to delivery to the customer or operator for use, the bevel slot is preferably cut by the customer because power saws vary in the lateral position of the 45° cut when the saw is tilted on the saw base. Of course, the slots 86 and 88 may also be cut by the ultimate customer or consumer by positioning the saw guide to make 45° and 90° cuts, as described later.

Referring to FIGS. 1 and 3, 90° stop 92 and 45° stops 94 may be seen to be attached to the board 10 top surface A so as to position the saw line 108 at 45° and 90° angles to the straight edge of the backup 14. The stops are preferably in the form of tabs 95 separated approximately the width of the swing assembly 38 such that the swing assembly 38 may be snugly fit therebetween to reduce any error in the angle of the saw line to the straight edge of the backup. The thickness of the tabs should be no greater than that of the shims 18 and 20. With the stops shown, the saw guide may be positioned easily and quickly to make 90° and 45° cuts in work pieces abutted against the backup 14. The saw line 108 will extend through the slots 86 or 88 when the saw guide is appropriately positioned by the corresponding stops 92 or 94. I prefer to use only the 45° and 90° stops because these are the angles most frequently used in connection with miter cuts.

The 90° slot 86 and the 45° slots 88 may be seen to provide convenient lineup points for lining a mark on the workpiece 22 with the saw line for 45° and 90° angle cuts. The mark on the workpiece may be aligned with the slot in the backup, or with the slot superficially cut into the shim 18, as appropriate for making the desired 45° or 90° cuts.

Referring specifically to FIGS. 3, 4, and 5, top angle marks 96 are preset on the top surface of the board 10. The top angle marks 96 are radially spaced from the center of a reference slot, preferably the 90° slot, in the face of the backup 14. In FIG. 4, the marks 96 are shown extended closer the slot 86 than preferred for clarity of the drawings. The marks are used by first positioning the saw guide at a reference angle, preferably 90°, to the backup. For the preferred embodiment, the swing assembly is positioned in the 90° stops and the workpiece 22 is placed on the shims 18 and 20. If a miter cut of 60° is desired at the end of a workpiece, a corner of the workpiece is positioned in the slot 86. An edge or side of the workpiece extending from the corner inserted in the slot 86 is aligned with a selected angle mark, corresponding to the desired cut angle, for this example "60°". It will be noted that the angle mark "60°" is at an angle of 30° to the straight edge of the backup, placing the saw line 108 at an angle of 60° to the edge of the workpiece aligned with the angle mark. Therefore, when the saw is operated to spin the blade and the workpiece cut by pushing the saw along the plates 32 and 34 until the saw blade spins through the workpiece to within the slot 86, a 60° angle miter cut will be made in the workpiece, as desired. For other angles, the selected angle mark will define an angle to the backup that is complementary to the desired cut angle. It will be understood that the angle marks 96 could be appropriately positioned at other points on the top surface A if the reference angle and slot are preset at other than the preferred 90° positions.

Referring specifically to FIG. 6, bottom angle marks 98 and reference line 100 may be seen to be preset on the bottom surface B of the board 10. A bottom work area extends from the reference line on the bottom surface B opposite the pivot point 70. The bottom angle marks 98 are positioned such that when an edge of the runners 80 is aligned against a selected bottom angle mark corresponding to a desired angle, the saw line is at the selected or desired angle to the reference line. For example, the marks for 90° on the bottom surface B are spaced apart the width of the swing assembly 38, such that when the runners 80 are abutted aginst the specified angle mark of 90°, the saw line is normal to the reference line. The saw guide may be held in the desired position, if necessary, with clamps, such clamping two wooden blocks to the board on either side of the swing assembly.

In operation, the workpiece to be cut at a desired angle miter cut is positioned with an edge abutted against the reference line. The saw guide is then positioned with the runner 80 abutted against a selected bottom angle mark and the spinning saw blade moved through the workpiece and across the reference line. The temporary shims 20 would preferably be used to avoid marring the bottom surface B of the board 10. It will be understood that any of the miter cuts described above may be made at bevel angles (where the saw blade is tilted, or nonperpendicular to the board surface), such as a 45° bevel cut along a 60° saw line miter angle, or a 50° bevel cut along any desired saw line miter angle, to the reference line on the bottom surface B. It may be necessary to realign the saw base and blade on the saw guide for some bevel cuts.

Thus the bottom surface of the board 10 in combination with the saw guide is extremely versatile, such that bevel cuts may be made at any point along workpieces at almost any desired angle.

Therefore, the top surface of the board 10 may be most conveniently used for making standard 45° and 90° miter cuts at any point along work pieces, and occasional different miter cuts at the ends of workpieces. The bottom surface B of the board 10 may be most conveniently used where a variety of miter cuts are required at different points on workpieces. Therefore, the top A and bottom B surfaces of the board 10, in combination with the saw guide, form a very versatile, efficient, simple, and inexpensively manufactured miter board performing substantially all the functions of a table saw, with the exception of ripping operations.

To aid in making cuts on the bottom surface B of the board 10, a temporary backup board may be clamped along the reference line 100. The temporary backup board may be with a short board extending part way across the surface B or, with proper clamping, it may extend the full width of surface B.

The embodiment shown and described above is only exemplary. I do not claim to have invented all the parts, elements or steps described. Various modifications can be made in the construction, material, arrangement, and operation, and still be within the scope of my invention.

The limits of the invention and the bounds of the patent protection are measured by and defined in the following claims. The restrictive description and drawing of the specific example above do not point out what an infringement of this patent would be, but are to enable the reader to make and use the invention.

As an aid to correlating the terms of the claims to the exemplary drawing, the following catalog of elements is provided:

| | |
|---|---|
| 10. board | 62. alignment slots |
| 12. permanent backup | 64. pivot pin |
| 14. replaceable backup | 66. pivot hole |
| 16. backup screws | 68. pivot point |
| 18. permanent shim | 70. pivot point |
| 20. temporary shim | 72. base |
| 22. workpiece | 74. end |
| 24. clampholes | 76. slot piece |
| 26. clamps | 78. block piece |
| 28. legs | 80. runners |
| 30. leg bolts | 82. spacer |
| 32. left plate | 84. back |
| 34. right plate | 85. reinforcement block |
| 36. pivot assembly | 86. 90° slot |
| 38. swing assembly | 88. 45° slot |
| 40. adjustment slots | 90. bevel slot |
| 42. rails | 92. 90° stop |
| 44. bolts | 94. 45° stops |
| 46. nuts | 95. tabs |
| 48. notches | 96. top angle marks |
| 50. keeper | 98. bottom angle marks |
| 52. screws | 100. reference line |
| 54. blocks | 102. saw |
| 56. block bolts | 104. saw base |
| 58. block washers | 106. saw blade |
| 60. block slots | 108. saw line |

I claim as my invention:

1. The method of making a cut at a desired angle in workpieces having
   a. a side and
   b. a corner at an end of the side; using
   c. a power saw having
   d. a circular saw blade extending through
   e. a saw base; and f. a device having g. a base having a top surface with a substantially planar work area, h. a saw guide pivoted to the top surface for movement about a pivot axis that is normal to the work area; and i. the saw guide being adapted to support the saw base above the work area; and j. the saw being slidably mounted on the saw guide with the saw blade in position to cut along a saw line through a workpiece positioned on the work area as the saw is moved along the saw guide:

wherein the improved process comprises the steps of:

k. positioning the saw guide at a preset location on the top surface with the saw line extending through a slot in a backup on the top surface, l. selecting an angle mark corresponding to the desired angle from a plurality of preset angle marks on the top surface, m. positioning the workpiece on the work area with the corner in the slot, n. aligning the workpiece side with the selected angle mark so that the workpiece side is at the desired angle to the saw line; then o. spinning the saw blade, p. sliding the saw base on the saw guide, and q. spinning the saw blade through the workpiece and into the slot in the backup, r. unpivoting the saw guide from the base, s. turning the base over, t. repivoting the saw guide to a bottom surface of the base, u. placing the workpiece on a substantially planar work area on the bottom surface, v. aligning the workpiece side with a straight reference line on the bottom surface, w. pivoting the saw guide about a bottom pivot axis until the saw line is aligned at the desired angle to the reference line; then x. spinning the saw blade, y. sliding the saw base on the saw guide, and z. spinning the saw blade through the workpiece.

2. The improved device for accurately cutting workpieces with a power saw, comprising:

a. a saw guide having b. a left track plate, c. a right track plate, d. the track plates being in a track plane, e. the track plates being spaced apart to form a track gap therebetween adapted to accommodate a saw blade of the saw therethrough when a saw base of the saw is slidably positioned on the plates, f. a pivot assembly attached to one end of the track plates, g. a swing assembly attached to an opposite end of the track plates, h. the assemblies providing means for spacing the plates above a planar surface with the track plane substantially parallel thereto, i. the assemblies each having a bottom adapted to rest on and slide across the planar surface, j. parallel rails on the plates in position to guide the saw base when the saw is moved along the plates so that the saw blade moves along a preset saw line, k. a base in the form of a flat board having l. a flat top surface, m. a backup with a straight edge attached to the top surface, n. a work area on the top surface adjacent and extending from the straight edge, o. a top pivot point on the top surface spaced away from the backup and opposite the work area, p. a flat bottom surface on the base, q. a straight reference line on the bottom surface, r. a work area on the bottom surface adjacent the reference line, s. a bottom pivot point on the bottom surface spaced away from the reference line and opposite the work area;

t. pivot means interconnecting the pivot assembly of the saw guide and the top and bottom surfaces at the pivot points thereof for pivoting the saw guide about pivot axes normal to the work areas; and u. the distance between the plates and the top surface when the saw guide is pivoted to the top surface being greater than the height of the backup above the top surface.

3. The invention as defined in claim 2 including limitations (a.) through (u.) with the addition of the following limitations:

v. adjustment means on the saw guide for securing the rails to the plates a selected distance apart, w. alignment slots in the assemblies extending from the track gap into each assembly, x. the alignment slots being substantially coplanar and having a width slightly greater than a circular saw blade, y. the saw line extending between the alignment slots, z. blocks on the assemblies that are adjustable to prevent the saw blade of a saw positioned on the track plates from entering the alignment slots.

4. The invention as defined in claim 2 including limitations (a.) through (u.) with the addition of the following limitations:

v. the pivot means being in the form of a pivot pin in the pivot assembly extending from the pivot assembly bottom into holes at the pivot points of the top and bottom surfaces, w. the pivot pin being aligned with the alignment slots.

5. The invention as defined in claim 2 including limitations (a.) through (u.) with the addition of the following limitation:

v. a plurality of holes in the board that are sized and positioned for convenient use of clamps therethrough to clamp workpieces to the board.

6. The invention as defined in claim 2 including limitations (a.) through (u.) with the addition of the following limitation:

v. a shim attached to the top surface of the board adjacent the straight edge of the backup.

7. The invention as defined in claim 2 including limitations (a.) through (u.) with the addition of the following limitations:

v. stops on the top surface adapted to position the saw guide at preset angles to the straight edge of the backup when the saw guide is pivoted to the top surface, w. one of the stops positioning the saw guide such that the saw line is at a reference angle to the straight edge of the backup, x. a reference slot in the backup aligned with the saw line when the saw guide is positioned at the reference angle, y. top angle marks on the top surface positioned such that a straight line extended between a selected angle mark corresponding to a desired angle, and the reference slot is at the desired angle with the saw line of a saw guide pivoted to the top surface at the reference angle.

8. The invention as defined in claim 2 including limitations (a.) through (u.) with the addition of the following limitations:
   v. legs removeably attached to the top surface,
   w. the legs extending from the top surface a distance that is greater than the height of the backup,
   x. bottom angle marks on the bottom surface positioned such that when the saw guide is pivoted to the bottom surface and an edge of the swing assembly is aligned with a selected bottom angle mark corresponding to a desired angle, the saw line intersects the reference line at the desired angle.

9. The invention as defined in claim 2 including limitations (a.) through (u.) with the addition of the following limitation:
   v. a keeper attached on the rail extending toward the track gap from the rail above the saw base.

10. The invention as defined in claim 2 including limitations (a.) through (u.) with the addition of the following limitations:
    v. the swing assembly having a width,
    w. each of the stops being in the form of two tabs attached to the top surface and spaced apart the swing assembly width,
    x. the tabs being positioned such that when the saw guide is pivoted on the top surface and the swing assembly is positioned between the tabs, the saw line intersects the backup at a selected angle to the straight edge thereof.

11. The invention as defined in claim 2 including limitations (a.) through (u.) with the addition of the following limitations:
    v. said adjustment means having
    w. adjustment slots in the track plates,
    x. bolts extending through holes in the rails and the adjustment slots,
    y. nuts threaded on the bolts for tightening and loosening the rails to the plates,
    z. notches in the assemblies adapted to permit access to the nuts and bolts with tools;
    aa. the blocks having
    bb. block members adjustably connected to the assemblies such that the block members may be extended toward the track gap to abut against a saw base of a saw positioned between the rails to block entry of the saw blade into the alignment slot; and
    cc. the alignment slot being proximate one of the track plates such that a saw blade guard of the saw rests on and slides along that track plate.

* * * * *